United States Patent [19]
Kobayashi

[11] 3,872,425
[45] Mar. 18, 1975

[54] OPERATION INDICATING DEVICE FOR HYDRAULIC BRAKE SYSTEM
[75] Inventor: Ikuya Kobayashi, Toyota, Japan
[73] Assignee: Toyota Jidosha Kogyo Kabushiki Kaisha, Toyota-shi, Aichi-ken, Japan
[22] Filed: Feb. 5, 1974
[21] Appl. No.: 439,714

Related U.S. Application Data
[62] Division of Ser. No. 249,769, May 3, 1972, Pat. No. 3,828,308.

[30] Foreign Application Priority Data
Oct. 13, 1971 Japan.............................. 46-80792

[52] U.S. Cl.............. 340/52 C, 317/155.5, 188/1 A
[51] Int. Cl.............................................. B60t 17/22
[58] Field of Search............ 340/52 B, 52 C, 60, 69; 317/155.5; 188/151 A, 152, 1 A

[56] References Cited
UNITED STATES PATENTS
| | | | |
|---|---|---|---|
| 1,752,353 | 4/1930 | Scott............................... | 317/155.5 |
| 2,788,514 | 4/1957 | Schmitt............................ | 340/69 |
| 3,423,727 | 1/1969 | Adamson......................... | 340/52 C |
| 3,560,918 | 2/1971 | Lewis et al....................... | 340/52 C |
| 3,560,920 | 2/1971 | Wing et al........................ | 340/52 C |

*Primary Examiner*—Alvin H. Waring
*Attorney, Agent, or Firm*—Stevens, Davis, Miller & Mosher

[57] ABSTRACT

An indicating device to alarm a vehicle driver of trouble with a hydraulic brake system of a vehicle. The indicating device comprises a closed-type pressure switch to be opened in response to line pressure of a certain value yielded within the hydraulic brake system, an open type brake switch to be closed in response to stepping on a brake pedal of the vehicle after the pressure switch is opened, a relay device including a first coil thereof energized by the closing of the brake switch with the pressure switch remaining extraordinarily closed, and a second coil thereof wound in an opposite direction against the first coil on an iron core on which the first coil is wound so as to operate a bi-stable contact device, and a pilot lamp, located on an instrument panel of the vehicle, being then connected to an electric current source through a key switch of the vehicle and the contact device when both of the pressure and brake switches are closed.

1 Claim, 6 Drawing Figures

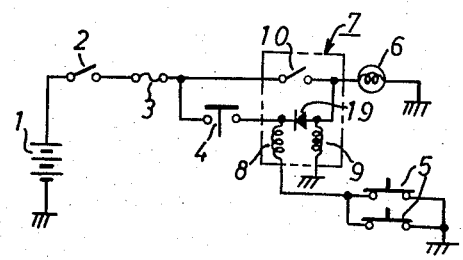
Fig. 1
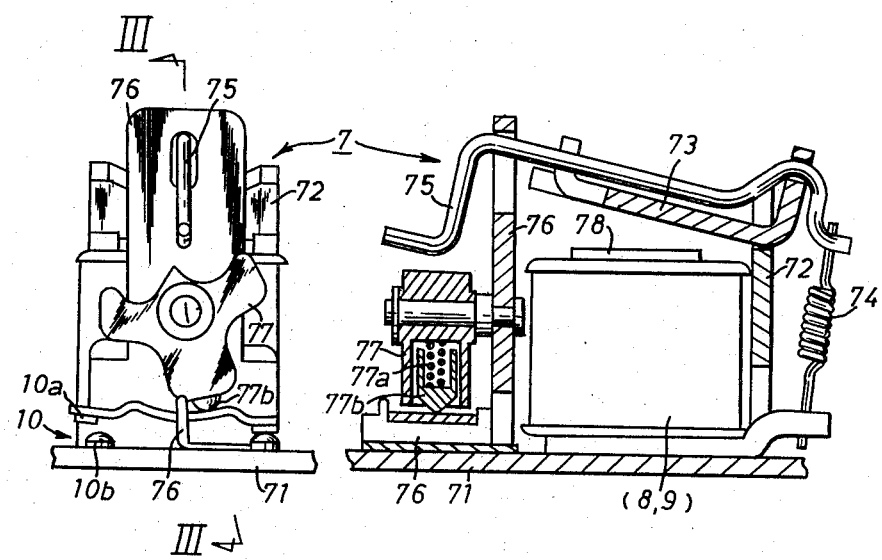
Fig. 2
Fig. 3

3,872,425

OPERATION INDICATING DEVICE FOR HYDRAULIC BRAKE SYSTEM

BACKGROUND OF THE INVENTION

This invention relates to an operation indicating device for a hydraulic brake system of a vehicle, and more particularly to an indicating device for detecting and warning to a vehicle driver of trouble in the hydraulic brake system.

SUMMARY OF THE INVENTION

A prime object of the present invention is, therefore, to provide an indicating device to alarm a vehicle driver of trouble in a hydraulic brake system by lighting a pilot lamp installed on, for instance, an instrument panel of the vehicle when the line pressure of fluid circuits of the brake system does not rise up to a predetermined value while a depressing actuation is given to a service brake pedal with a key or ignition key switch closed.

Another object of the present invention is to provide an indicating device, having the above-mentioned characteristics, wherein the pilot lamp remains lighted by way of a mechanical locking device provided therein upon closing the key switch until the problem is removed.

A further object of the present invention is to provide an indicating device, having the above-mentioned characteristics, wherein the pilot lamp is turned off by the depressing actuation given to the brake pedal after removal of the problem.

A still further object of the present invention is to provide an indicating device, having the above-mentioned characteristics, wherein the device is made compact and easily applicable to various conventional types of hydraulic brake system.

Accordingly, in the present invention provided within hydraulic circuits, connecting a master cylinder with wheel brake cylinders is a closed-type pressure switch to be opened in response to hydraulic pressure of a certain value yielded in the circuits and an open-type brake switch to be closed in response to a depressing actuation on a brake pedal of a vehicle after the pressure switch is opened. The present invention also comprises relay means including a first coil thereof energized by closing of the brake switch with the pressure switch remaining extraordinarily closed, and a second coil thereof would in an opposite direction against the first coil on an iron core on which the first coil is wound so as to operate a bi-stable contact device; and a pilot lamp, installed on an instrument panel of the vehicle, being then connected to an electric current source through a key switch of the vehicle and the contact device when both of the pressure and brake switches are closed. In the event of line pressure failure, or when no hydraulic pressure of a given value is created within the circuits in accordance with the brake pedal depression of a certain distance, the first coil of the relay means is energized to close the bi-stable contact device so as to activate the pilot lamp. The pilot lamp remains lighted until the hydraulic brake system is returned to its normal condition since the closed condition of the contact device is maintained by mechanical locking means provided therewith.

When the trouble within the hydraulic brake system are removed, the increase of the hydraulic pressure up to the predetermined value within the circuits is detected, and only the second coil of the relay means is energized to open the contact device to consequently deactivate the pilot lamp.

BRIEF DESCRIPTION OF THE DRAWINGS

The above and other objects, features and advantages of the present invention will become more readily apparent from the following description of the preferred embodiments with reference to the accompanying drawings forming a part of the specification.

In the drawings:

FIG. 1 is a schematic diagram showing the circuit of a first preferred embodiment in accordance with the present invention.

FIG. 2 illustrates a front view of a rachet device of the embodiment in FIG. 1.

FIG. 3 shows a sectional view taken along line III—III of FIG. 2.

DESCRIPTION OF THE PREFERRED EMBODIMENTS

Example 1

Figure 4:
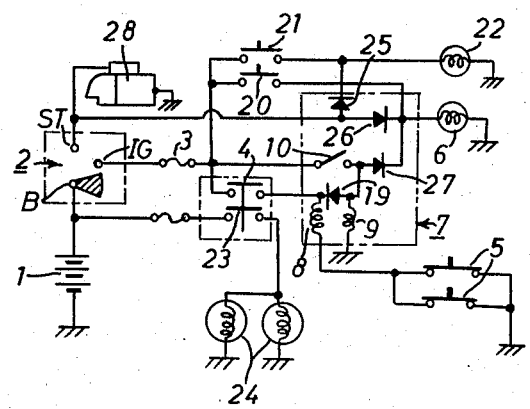
FIG. 4 is a schematic diagram indicating the circuit of an actual application of the first preferred embodiment in FIG. 1.

A first preferred embodiment of the present invention is disclosed in reference with FIGS. 1 to 3, inclusive. Particularly, referring now to FIG. 1, there are shown an electric source 1, a key switch 2, a fuse 3, an open-type brake switch 4 to be closed by a depressing actuation of a foot brake pedal for hydraulic brake system of a vehicle and closed-type pressure-switches 5 disposed within the hydraulic circuit of the hydraulic brake system, which is opened when hydraulic pressure reaches a certain predetermined value, for instance 5 kg./cm².

The pressure-switches 5 are provided independently each in hydraulic circuits for front and rear wheel brake systems. And the brake-switch 4 is so adjusted as to be closed after the pressure-switches 5 are opened in response to hydraulic pressure increase to the predetermined value by way of a depressing actuation of the brake pedal.

A pilot lamp 6 is located on a suitable place to check, for instance, an instrument panel of the vehicle, one terminal thereof being connected to the electric source 1 through contacts 10 and the other one thereof being grounded. The pilot lamp 6 is lighted only when the contacts 10 are closed mechanically by way of a ratchet device generally shown with 7 upon energization of either of an electromagnetic coil 8 or 9. The pair of the electromagnetic coils 8 and 9 is wound in opposite directions to each other on an integral iron core. Furthermore, the coils 8 and 9 are in parallel connection through a diode 19, and the coil 8 being grounded through the pressure-switches 5 and the coil 9 being directly grounded.

The ratchet device 7 is used to changeover the contacts 10 from the open position thereof to the closed one and vice versa and to maintain the given position of the contacts 10 when either one of the coil 8 or 9 is energized. As well illustrated in FIGS. 2 and 3, the ratchet device 7 comprises a bed 71 and the electromagnetic coils 8 and 9 wherein reference numeral 78 depicts the iron core fixed on the bed 71. A holding member 72 juts up from the bed 71 and a movable member 73 is swingably mounted on the holding member 72. An actuating rod 75 is securedly assembled with the movable member 73 and constantly biased clockwise by a compression coil spring 74. Another holding member 76 is fixedly mounted on the bed 71 to have a ratchet 77 rotatably journald thereon. A movable contact 10a is installed on the holding member 76, which will be biased onto a fixed contact 10b by way of an urging force of the ratchet 77. The ratchet 77 includes therein an urging piece 77b constantly biased outward by a coil spring 77a.

Operation of the above preferred embodiment of the present invention is described hereinafter in detail. The key-switch 2 is put on and the brake pedal is depressed to produce hydraulic pressure on the predetermined value within each hydraulic circuit. This shows the normal operation of the hydraulic brake system, and thus, the brake-swtich 4 is closed after the pressure-switches 5 are opened. No current is supplied to the electromagnetic coil 8 and the movable member 73 of the ratchet device 7 maintains its position as shown in FIG. 3. Consequently, the contacts 10 keep the open condition thereof and the pilot lamp 6 is not lighted.

In the case that the hydraulic pressure does not exceed the predetermined value by depressing actuation of the brake pedal with the key-switch 2 in its on-position, which means there is some pressure failure in such constructive elements of the hydraulic brake system as a master cylinder, operation fluid conduits, wheel cylinders, etc., the pressure-switches 5 remain closed though the brake pedal is depressed over a predetermined stroke, and the brake-switch 4 turns conductive. This supplies current only to the electromagnetic coil 8 which is then energized. The movable memeber 73 of the ratchet device 7 is attracted downward against resilient force of the spring 74 by magnetic power of the energized electromagnetic coil 8.

The operation rod 75 engages with and rotates clockwise the ratchet 77. The ratchet 77 is then held at the rotated position, when the movable contact 10a gets in contact with the fixed contact 10b to hold mechanically the contacts 10 in the closed condition thereof.

Thus, the pilot lamp 6 is turned on to warn the driver of the failure or extraordinary dangerous situation of the hydraulic brake system of the vehicle.

When the contacts 10 close, electric current is supplied to the coil 9, but since the electromagnetic coils 8 and 9 are so formed as previously described, that the coils are wound in opposite directions to each other around the integral iron core 78, the two coils 8 and 9 have opposite magnetic polarities to each other so that magnetic power generated respectively by the coils 8 and 9 is offset. Then, the operation rod 75 returns upward by returning force of the spring 74, the ratchet 77 mechanically holding the contacts 10 in the closed position thereof.

As described, when the pilot lamp 6 is once turned on, the contacts 10 are kept closed mechanically by the ratchet 77. The pilot lamp 6 is kept lighted constantly as long as the key-switch 2 is closed even with no depressing actuation on the brake pedal until the troubles are entirely removed from the hydraulic brake system.

In the case that the brake pedal is not depressed after the pilot lamp 6 is turned on, the key switch 2 being closed, the electromagnetic coil 9 is energized and also, the electromagnetic coil 8 is energized by current supplied thereto through the diode 19. Through the process as described in the above paragraph, however, the magnetic power repsectively generated by the coils 8 and 9 is offset to each other so that the ratchet 77 keeps the closed condition of the contacts 10.

When the troubles in the hydraulic brake system, which are indicated by the pilot lamp 6, are removed, the depressing actuation on the brake pedal produces necessary hydraulic pressure within the respective circuits. The hydraulic pressure produced operates the pressure switches 5 to open, and then, the brake switch 4 is conditioned to its closed position. Electric current is supplied only to the coil 9, the magnetic power of which attracts the movable member 73 of the ratchet device 7 downward against the resilient force of the spring 74. The actuating rod 75 rotates the ratchet 77 counterclockwise to open the contacts 10. Consequently, the pilot lamp 6 is turned off to indicate that the hydraulic brake system is returned to its normal situation.

ACTUAL APPLICATION OF FIRST PREFERRED EMBODIMENT

Shown in diagrammatic FIG. 4 is an actual application of the first preferred embodiment in a well known vehicle. An open-type oil-level detecting switch 20 closes when the oil level goes down by a certain predetermined value, for instance, a half of the level distance, within the oil reservoir of the master cylinder of the hydraulic brake system. Reference numerals 21 to 24 inclusive indicate respectively in sequence an open-type parking-brake switch to be closed upon operation of the parking brake, a parking brake pilot lamp, a brake-lamp switch to be closed in response to the depressing actuation on the brake pedal, and brake-lamps to be installed on the rear body of the vehicle.

The constructive features in this application are such that an ignition switch 2 corresponds to the key switch 2 of the first preferred embodiment, the brake-lamp switch 23 is operatively connected with the brake switch 4, and the lamp 6 can be turned on by way of the oil level detecting switch 20. Other constructional elements are just the same as those already explained in the first preferred embodiment and a repeated description is omitted herewith, the same reference numerals being used for the same parts. Blocking diodes 25, 26 and 27 are provided in this application so that they prevent reverse run of electric current to a starter 28 when the switches 10, 20 or 21 is closed respectively.

In the described application, while the ignition key switch 2 is closed, the parking brake switch 21 is closed in response to the operation of the parking brake so as to turn the parking lamp 22 on. The depressing actuation on the brake pedal closes first the brake-lamp switch 23 to turn on the brake lamp 24, and consequently, hydraulic pressure is produced within the circuits. When the pressure increases up to a predetermined value, first the pressure switches 5 become open and second the brake switch 4 is closed. Thus, the pilot lamp 6 remains unlighted with no supply of electric current thereto. If the operation fluid within the oil reservoir decreases in quantity down below the predetermined value, the oil-level detecting switch 20 is closed to turn the pilot lamp 6 on.

Furthermore, in this application, conduction of the ST terminal of the ignition key switch 2 turns the pilot lamps 6 and 22 on. Therefore, any disconnection of the lamps 6 and/or 22 can easily and surely be detected. All the other operations are just the same as those disclosed in the first preferred embodiment and no repetition is made herein.

Example 2

Figure 5:
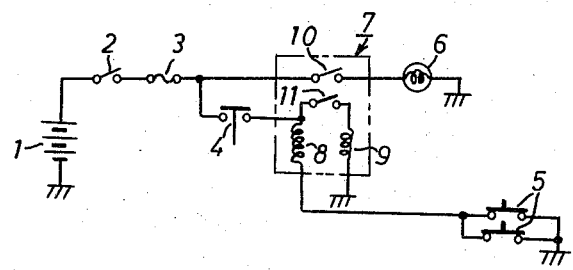
FIG. 5 shows a schematic diagram of the circuit of a second preferred embodiment in accordance with the present invention.

Disclosed in FIG. 5 is a second preferred embodiment of the present invention. Having all other constructions made the same as those in the first preferred embodiment, the second preferred embodiment is featured in that the electromagnetic coil 9 is, instead of being connected to the pilot lamp 6, connected to the brake switch 4 in parallel by way of an electromagnetic relay 11 which is interlocked with the contacts 10.

When the depressing actuation on the brake pedal produces hydraulic pressure of the predetermined value within the circuits, the pressure switches 5 open and, in turn, the brake switch 4 is closed. Consequently, no electric current is supplied to the electromagnetic coil 8, and the contacts 10 remain open through the operation described in the first preferred embodiment. In this instance the pilot lamp 6 is not turned on.

In the extraordinary case that the actuation of the brake pedal does not produce enough pressure while the keyswitch 2 is closed, the pressure switches 5 remain closed and the brake switch 4 is closed. This supplies only the electromagnetic coil 8 with electric current to energize the same. Through the operation described in the first preferred embodiment, therefore, the contacts 10 are kept closed by the ratchet device 7 and, at the same time, the relay 11 is also closed. Consequently, the pilot lamp 6 is turned on to alarm the driver of the extraordinary situation of the hydraulic brake system.

When the relay 11 is closed, the electromagnetic coil 9 turns conductive and is energized. As referred to the first preferred embodiment, however, the opposite winding of the coils repsectively in the electromganetic coils 8 and 9 causes the opposite magnetic polarities in the respective coils 8 and 9. Thus, the magnetic force generated respectively by the coils 8 and 9 offsets to each other so as to let the ratchet 77 of the ratchet device 7 hold the closed positions of the contacts 10 and the relay 11.

After the pilot lamp 6 is turned on, the contacts 10 and the relay 11 are constantly kept closed mechanically. The pilot lamp 6 turns on always in response to conditioning of the key switch 2 to its closed position regardless of any depressing operation of the brake pedal.

Further in this case, the electromagnetic coils 8 and 9 are not energized while the brake pedal is not depressed.

Upon removal of the troubles within the hydraulic brake system, the depressing actuation on the brake pedal produces the hydraulic pressure within the circuits in the predetermined or greater value. The pressure switches 5 are first opened and in turn the brake switch 4 is closed. Accordingly, electric current is supplied only to the coil 9 through the relay 11 which is in its closed position. Energization of the coil 9 raises the magnetic force to operate the ratchet device 7 in the way described in the first preferred embodiment. The contacts 10 and the relay 11 are opened to turn off the pilot lamp 6, which indicates that the hydraulic brake system is now returned to its normal operation state.

In this second preferred embodiment, the electromagnetic coils 8 and 9 can be of a short-time rating since they are not energized while the brake pedal is released.

APPLICATION OF THE SECOND PREFERRED EMBODIMENT

Figure 6:
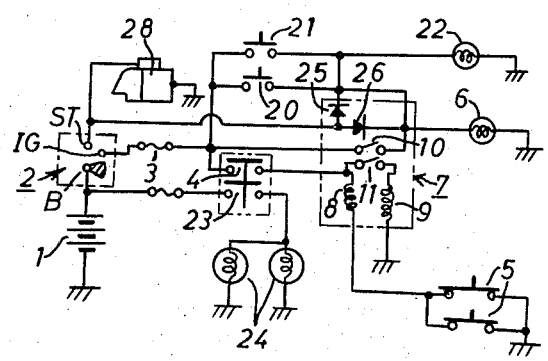
FIG. 6 is a schematic diagram indicating the circuit of an actual application of the second preferred embodiment in FIG. 5.

FIG. 6 indicates an actual application of the second preferred embodiment in a well known vehicle. This application may be featured in that the electromagnetic coil 9 is connected to the brake switch 4 through the relay 11 interlocked with the contacts 10 and, consequently, the diodes 19 and 27 in the application of the first preferred embodiment become unnecessary. All of the other constructions are same as those in the application of the first preferred embodiments as well as in the second preferred embodiment. The operation of this application can well be understood in reference to those in the second preferred embodiment and the application of the first preferred embodiment. No repetition is made herewith.

It has well been disclosed hereinabove that the present invention has novel features to warn without fail of troubles within the hydraulic brake system and to indicate return of the system to its normal situation.

The bi-stable electromagnetic relays in the described embodiments have been expressed to include mechanical ratchet devices, but other types of relays for instance, with permanent magnets, can well be utilized for the purpose of the present invention.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A device for indicating troubles within an automobile hydraulic brake system having a master cylinder, wheel brake cylinders and hydraulic braking circuits to connect said master cylinder with said wheel brake cylinder, comprising:

an electric source
a key switch;
a pilot lamp located at a convenient place;
contact means for selectively connecting said source to said lamp through said key switch;
normally closed pressure switch means disposed within said braking circuits to be opened in response to a pressure value at or over a predetermined one within said braking circuits;
brake switch means normally opened and operable with a foot brake pedal on which stepping causes closing of said brake switch means, said closing being conducted after opening of said pressure switch means in normal operation thereof when pressure of said predetermined value is produced within said braking circuits;

relay means including a first coil thereof energized by closing of said brake switch means with said pressure switch means remaining extraordinarily closed, a second coil thereof wound in an opposite direction against said first coil on an iron core on which said first coil is wound, and means including contacts interposed between said first and second coils and interlocked with said contact means for blocking current supply to said coil through said first coil, solo-energization of said first coil closing said contact means to light said pilot lamp, solo-energization of said second coil opening said contact means to turn off said pilot lamp and energization of both coils at a time with said contact means closed offsetting magnetic power generated respectively by said first and second coils to cause no effect on said contact means so as to let said pilot lamp remain lighted; and bi-stable locking means operated by energization of either of said coils to maintain the closed or open position of said contact means.

* * * * *